United States Patent
Cheng et al.

(10) Patent No.: US 9,909,654 B2
(45) Date of Patent: Mar. 6, 2018

(54) LINEAR GEAR SHIFT POWER TRANSFER MECHANISM

(71) Applicant: MOTIVE POWER INDUSTRY CO., LTD., Dacun Township (TW)

(72) Inventors: Hsin-Lin Cheng, Dacun Township (TW); Ching-Chung Teng, Dacun Township (TW)

(73) Assignee: MOTIVE POWER INDUSTRY CO., LTD. (TW)

( * ) Notice: Subject to any disclaimer, the term of this patent is extended or adjusted under 35 U.S.C. 154(b) by 369 days.

(21) Appl. No.: 14/926,075

(22) Filed: Oct. 29, 2015

(65) Prior Publication Data

US 2017/0122415 A1 May 4, 2017

(51) Int. Cl.
*F16H 15/32* (2006.01)

(52) U.S. Cl.
CPC .................................. *F16H 15/32* (2013.01)

(58) Field of Classification Search
CPC ........... F16H 15/32; F16H 15/00; F16H 15/06
See application file for complete search history.

(56) References Cited

U.S. PATENT DOCUMENTS

| | | | | |
|---|---|---|---|---|
| 1,838,096 A | * | 12/1931 | Fleischel | F16H 3/24 477/80 |
| 4,905,545 A | * | 3/1990 | Leising | F16H 61/08 477/133 |
| 5,211,080 A | * | 5/1993 | Leising | F16H 61/0206 475/120 |
| 2004/0018908 A1 | * | 1/2004 | Gazyakan | B60K 17/3462 475/210 |
| 2011/0005480 A1 | * | 1/2011 | Voegeli | F01B 9/047 123/53.6 |
| 2016/0091059 A1 | * | 3/2016 | Boulet | F16H 3/66 475/149 |
| 2016/0273461 A1 | * | 9/2016 | Cousins | F02D 29/02 |

* cited by examiner

*Primary Examiner* — David M Fenstermacher
(74) *Attorney, Agent, or Firm* — Schmeiser, Olsen & Watts, LLP

(57) ABSTRACT

A linear gear shift power transfer mechanism includes a gear shift unit; a power input clamp ring element having an inward-tilted power input ring surface, first teardrop-shaped recesses and first radial positioning hole; a power output clamp ring element having an inward-tilted power output ring surface, second teardrop-shaped recesses and second radial positioning hole; a first ball ring element whose first positioning ring element has a first positioning portion and bulging ring element each provided with limiting slots; a power input rotator having a third teardrop-shaped recesses and first axial positioning hole; a power output rotator having fourth teardrop-shaped recesses and second axial positioning hole; helical resilient elements having radial and axial positioning posts and received in bulging ring elements, with the radial positioning posts disposed in first and second radial positioning holes through the limiting slots, the axial positioning posts disposed in first and second axial positioning holes.

14 Claims, 18 Drawing Sheets

LINEAR GEAR SHIFT POWER TRANSFER MECHANISM

FIELD OF TECHNOLOGY

The present invention relates to linear gear shift power transfer mechanisms and more particularly to a linear gear shift power transfer mechanism which is structurally simple and compact, incurs little transmission loss, and never jerks while shifting gear.

BACKGROUND

To adjust speed and reduce gasoline consumption, every means of transportation nowadays is equipped with a gear shift mechanism. A conventional gear shift mechanism transfers power with a gear train or with a gear train and an oil duct. However, the gear train or the combination of the gear train and the oil duct is structurally intricate and bulky, incurs much transmission loss, and tends to jerk while shifting gear. Therefore, a stepless gear shift mechanism characterized by two grooved wheels operating in conjunction with a V-shaped belt is developed. However, the stepless gear shift mechanism has a disadvantage, namely large volume of the grooved wheels and the V-shaped belt. Accordingly, the present invention aims to disclose a linear gear shift power transfer mechanism which is structurally simple and compact, incurs little transmission loss, and never jerks while shifting gear.

SUMMARY

In view of the aforesaid drawbacks of the prior art, the inventor of the present invention recognized room for improvement in the prior art and thus conducted extensive researches to therefore develop a linear gear shift power transfer mechanism which is structurally simple and compact, incurs little transmission loss, and never jerks while shifting gear.

The present invention provides a linear gear shift power transfer mechanism which comprises: a gear shift unit having a support rotator, a plurality of transmission balls and a plurality of driving posts, with the transmission balls spaced apart from each other and movably disposed at the support rotator, the transmission balls each having a cylindrical receiving portion along a radial direction thereof, the driving posts having inward ends movably disposed in the cylindrical receiving portions, respectively, along a radial direction of the support rotator, and the driving posts driving the support rotator to rotate; a power input clamp ring element having a lateral side provided with an inward-tilted power input ring surface and another lateral side provided with first teardrop-shaped recesses arranged annularly, wherein a first radial positioning hole is disposed at an inner edge of the power input clamp ring element; a power output clamp ring element having a lateral side provided with an inward-tilted power output ring surface and another lateral side provided with annularly arranged second teardrop-shaped recesses, wherein a second radial positioning hole is disposed at an inner edge of the power output clamp ring element, with the transmission balls movably clamped between the inward-tilted power input ring surface, the inward-tilted power output ring surface and the support rotator, wherein heads of the first teardrop-shaped recesses and heads of the second teardrop-shaped recesses face same tangential direction; two first ball ring elements each having a plurality of first balls and a first positioning ring element, with the first positioning ring elements each having a plurality of first positioning portions whereby the first balls are positioned, respectively, wherein a bulging ring element is disposed on an inner edge of each said first positioning ring element and has a limiting slot; a power input rotator having a lateral side provided with a first axial positioning hole and annularly arranged third teardrop-shaped recesses, wherein heads of the third teardrop-shaped recesses and heads of the first teardrop-shaped recesses face opposite tangential directions, wherein the first balls of the first ball ring elements are movably clamped between the first teardrop-shaped recesses and the third teardrop-shaped recesses; a power output rotator having a lateral side provided with a second axial positioning hole and annularly arranged fourth teardrop-shaped recesses, wherein heads of the fourth teardrop-shaped recesses and heads of the second teardrop-shaped recesses face opposite tangential directions, wherein the first balls of the first ball ring elements are movably clamped between the second teardrop-shaped recesses and the fourth teardrop-shaped recesses; and two helical resilient elements each having two ends provided with a radial positioning post and an axial positioning post, respectively, the two helical resilient elements being received in the bulging ring elements, respectively, with the radial positioning posts disposed in the first radial positioning hole and the second radial positioning hole through the limiting slots, respectively, and with the axial positioning posts disposed in the first axial positioning hole and the second axial positioning hole, respectively.

Regarding the linear gear shift power transfer mechanism, the inward-tilted power input ring surface and the inward-tilted power output ring surface are disposed on two opposing sides of the transmission balls, respectively, and the transmission balls are movably disposed on an outer circumferential surface of the support rotator.

Regarding the linear gear shift power transfer mechanism, the driving posts rotate from the radial direction of the support rotator to but not reach the axial direction of the support rotator.

Regarding the linear gear shift power transfer mechanism, the power input rotator and the power output rotator rotate in opposite directions.

Regarding the linear gear shift power transfer mechanism, the bulging ring elements are received in the power input clamp ring element and the power output clamp ring element, respectively.

Regarding the linear gear shift power transfer mechanism, the power input rotator has a first connection shaft for pivotally connecting with a lateral side of the support rotator, and the power output rotator has a second connection shaft for pivotally connecting with another lateral side of the support rotator.

The linear gear shift power transfer mechanism, further comprises two annular covers, two bearings and two second ball ring elements, with a power input shaft disposed on another lateral side of the power input rotator, and a power output shaft disposed on another lateral side of the power output rotator, wherein the second ball ring elements each have a plurality of second balls and a second positioning ring element, and the second positioning ring elements each have a plurality of second positioning portions whereby the second balls are positioned, respectively, wherein the bearings fit around the power input shaft and the power output shaft, respectively, and the annular covers fit around the bearings, respectively, wherein the second balls of the second ball ring elements are movably clamped between the annular covers and the power input rotator and between the annular covers and the power output rotator, respectively.

The present invention provides another linear gear shift power transfer mechanism which comprises: a gear shift unit having a support rotator, a plurality of transmission balls and a plurality of driving posts, with the transmission balls spaced apart from each other and movably disposed at the support rotator, and a cylindrical receiving portion disposed in a radial direction of each said transmission ball, wherein the driving posts having inward ends movably disposed in the cylindrical receiving portions, respectively, along a radial direction of the support rotator, and the driving posts driving the support rotator to rotate; a power input clamp ring element having a lateral side provided with an inward-tilted power input ring surface and another lateral side provided with annularly arranged first teardrop-shaped recesses and first connecting portions; a power output clamp ring element having a lateral side provided with an inward-tilted power output ring surface and another lateral side provided with annularly arranged second teardrop-shaped recesses and second connecting portions, with the transmission balls movably clamped between the inward-tilted power input ring surface, the inward-tilted power output ring surface and the support rotator, wherein heads of the first teardrop-shaped recesses and heads of the second teardrop-shaped recesses face opposite tangential directions; a first ball ring element having a plurality of first balls and a first positioning ring element, with the first positioning ring element having a plurality of first positioning portions whereby the first balls are positioned, respectively; a second ball ring element having a plurality of second balls and a second positioning ring element, with the second positioning ring element having a plurality of second positioning portions whereby the second balls are positioned, respectively; a power input rotator having a lateral side provided with annularly arranged third teardrop-shaped recesses and third connecting portions, wherein heads of the third teardrop-shaped recesses and heads of the first teardrop-shaped recesses face opposite tangential directions, and the first balls of the first ball ring element are movably clamped between the first teardrop-shaped recesses and the third teardrop-shaped recesses; a power output rotator having a lateral side provided with annularly arranged fourth teardrop-shaped recesses and fourth connecting portions, wherein heads of the fourth teardrop-shaped recesses and heads of the second teardrop-shaped recesses face opposite tangential directions, and the second balls of the second ball ring element are movably clamped between the second teardrop-shaped recesses and the fourth teardrop-shaped recesses; and a plurality of elastic elements connected between the first connecting portions and the third connecting portions and between the second connecting portions and the fourth connecting portions, respectively.

Regarding the other linear gear shift power transfer mechanism, the inward-tilted power input ring surface and the inward-tilted power output ring surface are positioned on the same side of the transmission balls, wherein a lateral ring surface of the support rotator is positioned beside the transmission balls in a manner to be opposite to the inward-tilted power input ring surface and the inward-tilted power output ring surface.

Regarding the other linear gear shift power transfer mechanism, further comprises a fourth ball ring element having a plurality of fourth balls and a fourth positioning ring element, with the fourth positioning ring element having a plurality of fourth positioning portions whereby the fourth balls are positioned, respectively, wherein the fourth balls of the fourth positioning ring element are movably clamped between the power input rotator and the power output rotator.

Regarding the other linear gear shift power transfer mechanism, further comprises two annular covers, two bearings and two third ball ring elements, with a power input shaft disposed on another lateral side of the power input rotator, and a power output shaft disposed on another lateral side of the power output rotator, wherein the third ball ring elements each have a plurality of third balls and a third positioning ring element, and the third positioning ring elements each have a plurality of third positioning portions whereby the third balls are positioned, respectively, wherein the bearings fit around the power input shaft and the power output shaft, respectively, and the annular covers fit around the bearings, respectively, wherein the third balls of the third ball ring elements are movably clamped between the annular covers and the support rotator and between the annular covers and the power output rotator, respectively.

Regarding the other linear gear shift power transfer mechanism, the driving posts rotate from the radial direction of the support rotator to but not reach the axial direction of the support rotator.

Regarding the other linear gear shift power transfer mechanism, the power input rotator and the power output rotator rotate in the same direction.

Regarding the other linear gear shift power transfer mechanism, the first connecting portions and the second connecting portions are each a bulging structure, wherein the third connecting portions and the fourth connecting portions are each a U-shaped receiving structure, with the bulging structures disposed at openings of the U-shaped receiving structures, respectively, and the elastic elements disposed in the U-shaped receiving structures, respectively.

Therefore, the linear gear shift power transfer mechanism of the present invention is structurally simple and compact, incurs little transmission loss, and never jerks while shifting gear.

BRIEF DESCRIPTION

Objectives, features, and advantages of the present invention are hereunder illustrated with specific embodiments in conjunction with the accompanying drawings, in which.

DETAILED DESCRIPTION

Figure 3:
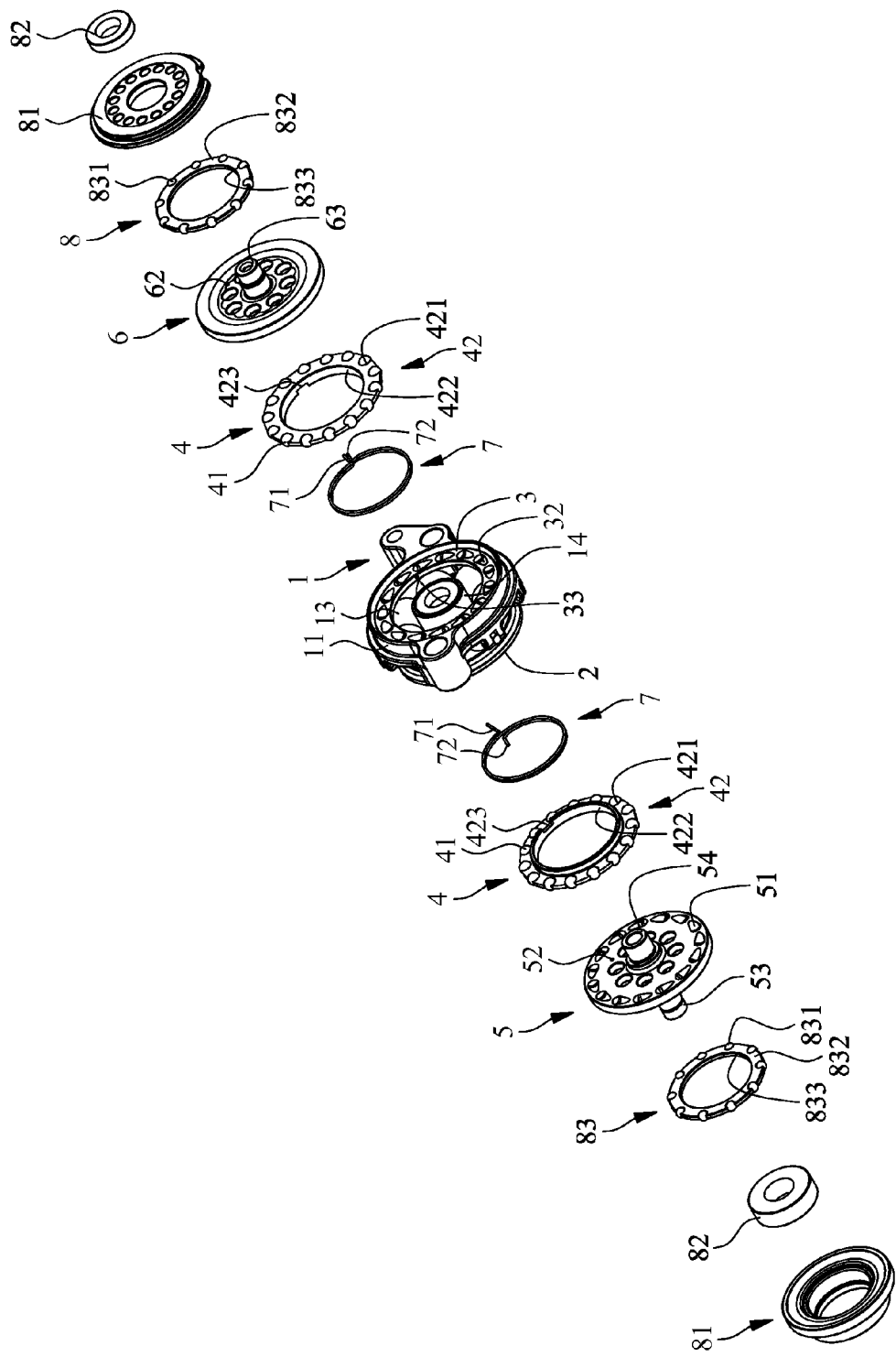
FIG. 3 is an exploded view of a preferred embodiment of the present invention from yet another angle of view.
Figure 4:
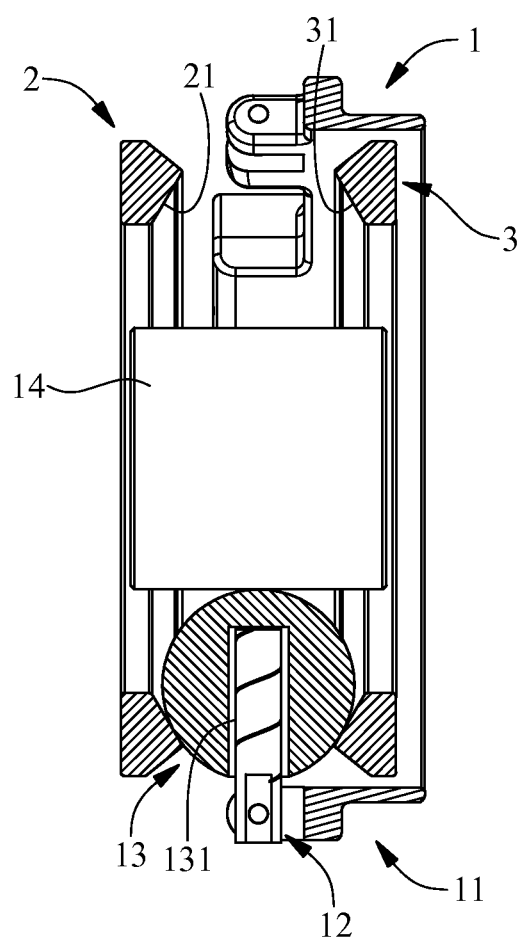
FIG. 4 is a cross-sectional view of a gear shift unit, a power input clamp ring element and a power output clamp ring element according to a preferred embodiment of the present invention.
Figure 5:
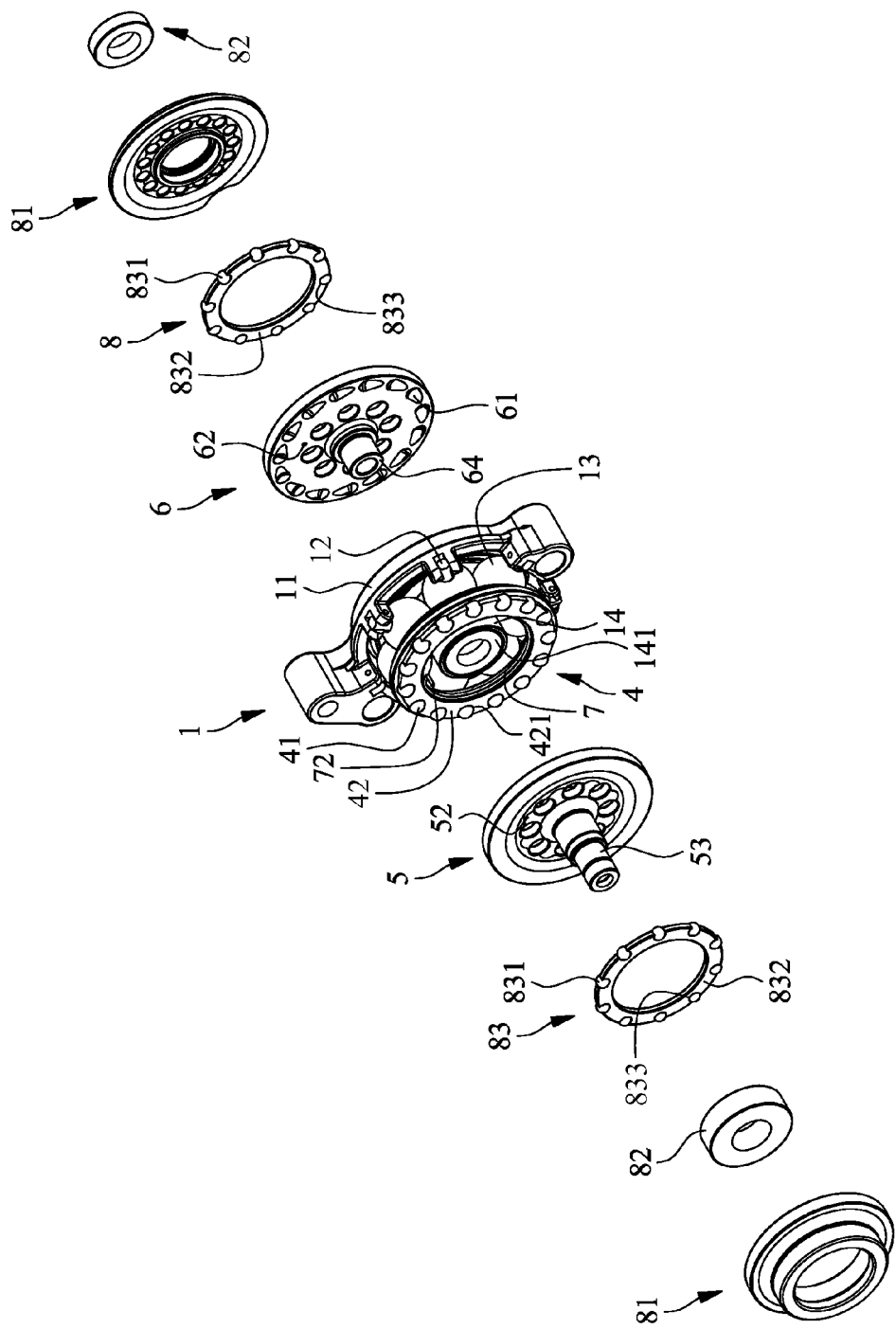
FIG. 5 is a partial assembled schematic view of a preferred embodiment of the present invention.
Figure 6:
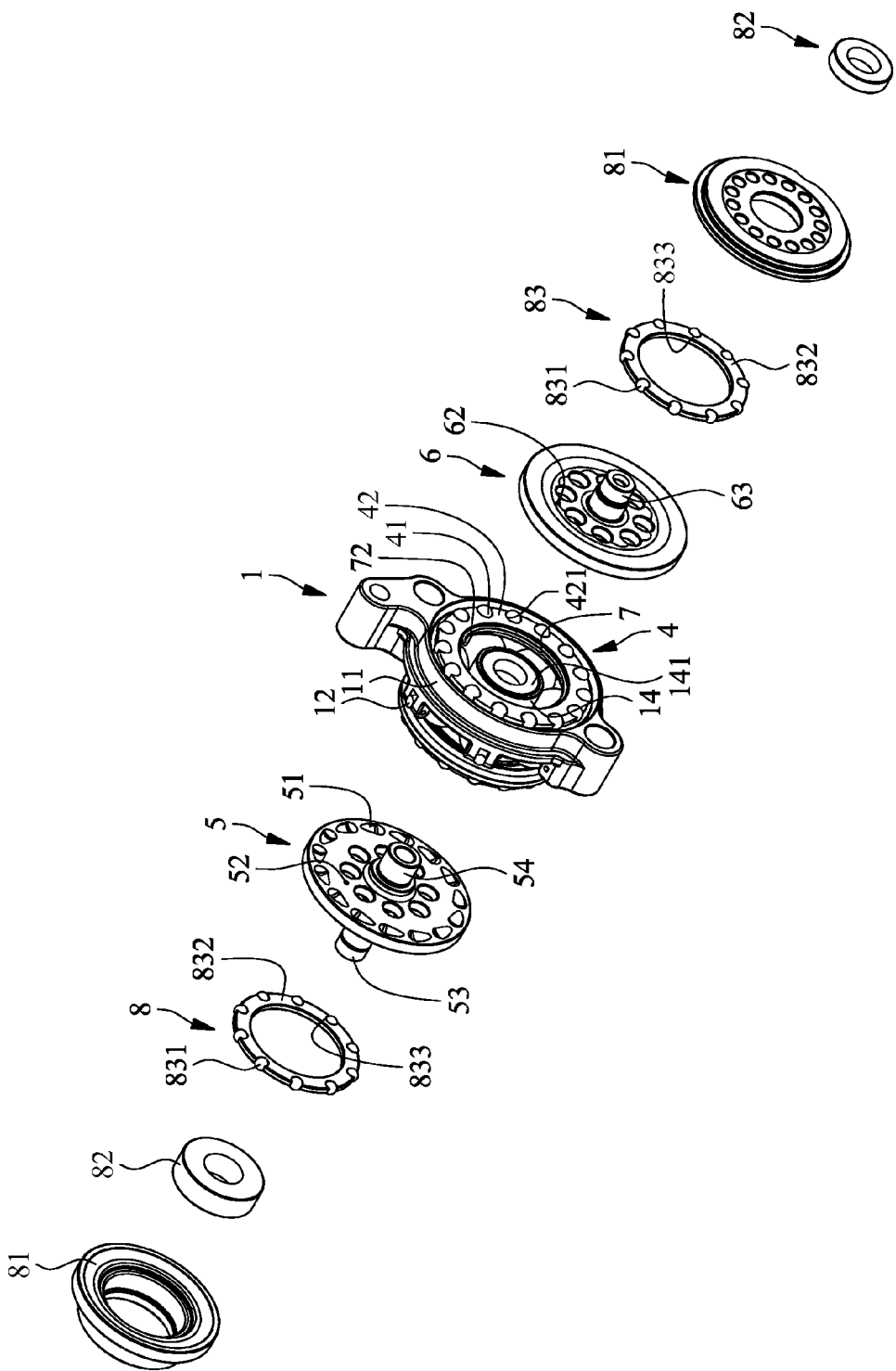
FIG. 6 is a partial assembled schematic view of a preferred embodiment of the present invention from another angle of view.

Referring to FIG. 1 through FIG. 8, to illustrate how transmission balls 13, driving posts 12, a power input clamp ring element 2 and a power output clamp ring element 3 are connected, FIG. 4 shows only how a transmission ball 13 and a driving post 12 are connected to the power input clamp ring element 2 and the power output clamp ring element 3, because the other transmission balls and driving posts not shown are connected in the same way as illustrated with FIG. 4. As shown in the diagrams, the present invention provides a linear gear shift power transfer mechanism which comprises a gear shift unit 1, a power input clamp ring element 2, a power output clamp ring element 3, two first ball ring elements 4, a power input rotator 5, a power output rotator 6 and two helical resilient elements 7. The gear shift unit 1 has a driving ring element 11, a plurality of driving posts 12, a plurality of transmission balls 13 and a support rotator 14. The transmission balls 13 are spaced apart from each other by the same angle of circumference and movably disposed on the outer circumferential surface of the support rotator 14. A cylindrical receiving portion 131 is disposed on each transmission ball 13 along the radial direction thereof. The cylindrical receiving portion 131 is a cylindrical receiving recess. The driving posts 12 have inward ends movably disposed in the cylindrical receiving portion 131, respectively, along the radial direction of the support rotator 14. The outward ends of the driving posts 12 are pivotally connected to the driving ring element 11 and spaced apart from each other by the same angle of circumference. The driving ring element 11 undergoes translation in the axial direction of the support rotator 14 to drive the driving posts 12 and the transmission balls 13 to rotate clockwise or counterclockwise from the radial direction of the support rotator 14 to but not reach the axial direction of the support rotator 14. An inward-tilted power input ring surface 21 is disposed in the vicinity of the outer edge of a lateral side of the power input clamp ring element 2. Annularly arranged first teardrop-shaped recesses 22 are disposed in the vicinity of the outer edge of the other lateral side of the power input clamp ring element 2. A first radial positioning hole 23 is disposed at the inner edge of the power input clamp ring element 2. An inward-tilted power output ring surface 31 is disposed in the vicinity of the outer edge of a lateral side of the power output clamp ring element 3. Annularly arranged second teardrop-shaped recesses 32 are disposed in the vicinity of the outer edge of the other lateral side of the power output clamp ring element 3. A second radial positioning hole 33 is disposed at the inner edge of the power output clamp ring element 3. The inward-tilted power input ring surface 21 and the inward-tilted power output ring surface 31 are disposed on two opposing sides of the transmission balls 13, respectively. The transmission balls 13 are movably disposed on the outer circumferential surface of the support rotator 14. The transmission balls 13 are movably clamped between the inward-tilted power input ring surface 21, the inward-tilted power output ring surface 31 and the outer circumferential surface of the support rotator 14. The heads of the first teardrop-shaped recesses 22 and the heads of the second teardrop-shaped recesses 32 face the same tangential direction. The first ball ring elements 4 each have a plurality of first balls 41 and a first positioning ring element 42. The first positioning ring elements 42 each have a plurality of first positioning portions 421 whereby the first balls 41 are positioned, respectively. The first positioning portions 421 are spaced apart from each other by the same angle of circumference. The first positioning portions 421 are recesses or through holes. A bulging ring element 422 is disposed on the lateral side of the inner edge of each first positioning ring element 42. The bulging ring elements 422 each have a limiting slot 423. The power input rotator 5 has a lateral side provided with a first axial positioning hole 52 and annularly arranged third teardrop-shaped recesses 51. The third teardrop-shaped recesses 51 are disposed in the vicinity of the outer edge of the power input rotator 5. The heads of the third teardrop-shaped recesses 51 and the heads of the first teardrop-shaped recesses 22 face opposite tangential directions. The first balls 41 of the first ball ring elements 4 are movably clamped between the first teardrop-shaped recesses 22 and the third teardrop-shaped recesses 51. The diameter of the first balls 41 is slightly less than the diameter of the heads of the first teardrop-shaped recesses 22 and the diameter of the heads of the third teardrop-shaped recesses 51. The power output rotator 6 has a lateral side provided with a second axial positioning hole 62 and annularly arranged fourth teardrop-shaped recesses 61. The fourth teardrop-shaped recesses 61 are disposed in the vicinity of the outer edge of the power output rotator 6. The heads of the fourth teardrop-shaped recesses 61 and the heads of the second teardrop-shaped recesses 32 face opposite tangential directions. The first balls 41 of the first ball ring elements 4 are movably clamped between the second teardrop-shaped recesses 32 and the fourth teardrop-shaped recesses 61. The diameter of the first balls 41 is slightly less than the diameter of the heads of the second teardrop-shaped recesses 32 and the diameter of the heads of the fourth teardrop-shaped recesses 61. A radial positioning post 71 and an axial positioning post 72 are disposed at the two ends of each helical resilient element 7, respectively. The helical resilient elements 7 are received in the bulging ring elements 422, respectively. The radial positioning posts 71 are disposed in the first radial positioning hole 23 and the second radial positioning hole 33 through the limiting slots 423, respectively. The axial positioning posts 72 are disposed in the first axial positioning hole 52 and the second axial positioning hole 62, respectively.

Figure 1:
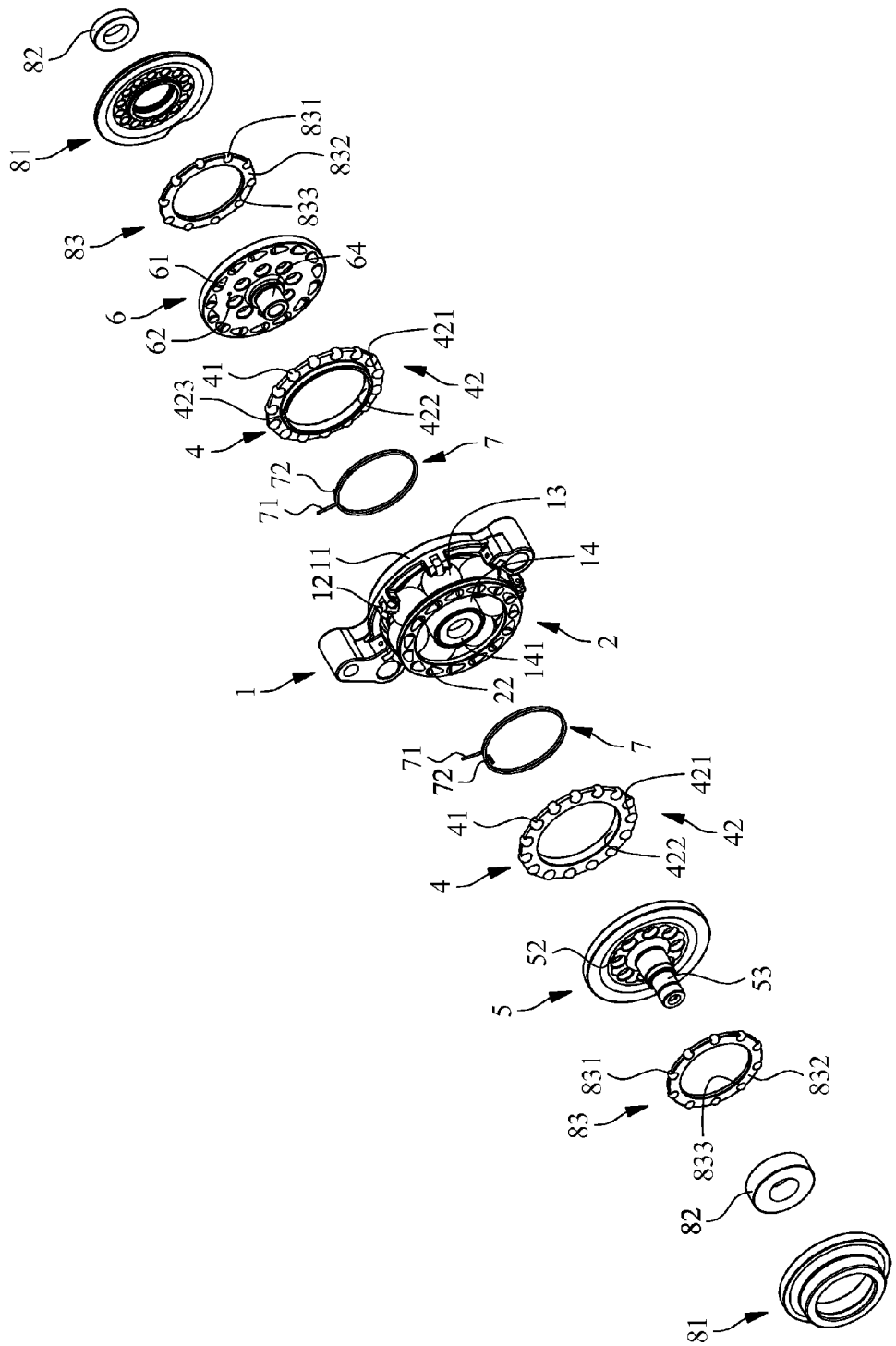
FIG. 1 is an exploded view of a preferred embodiment of the present invention.
Figure 2:
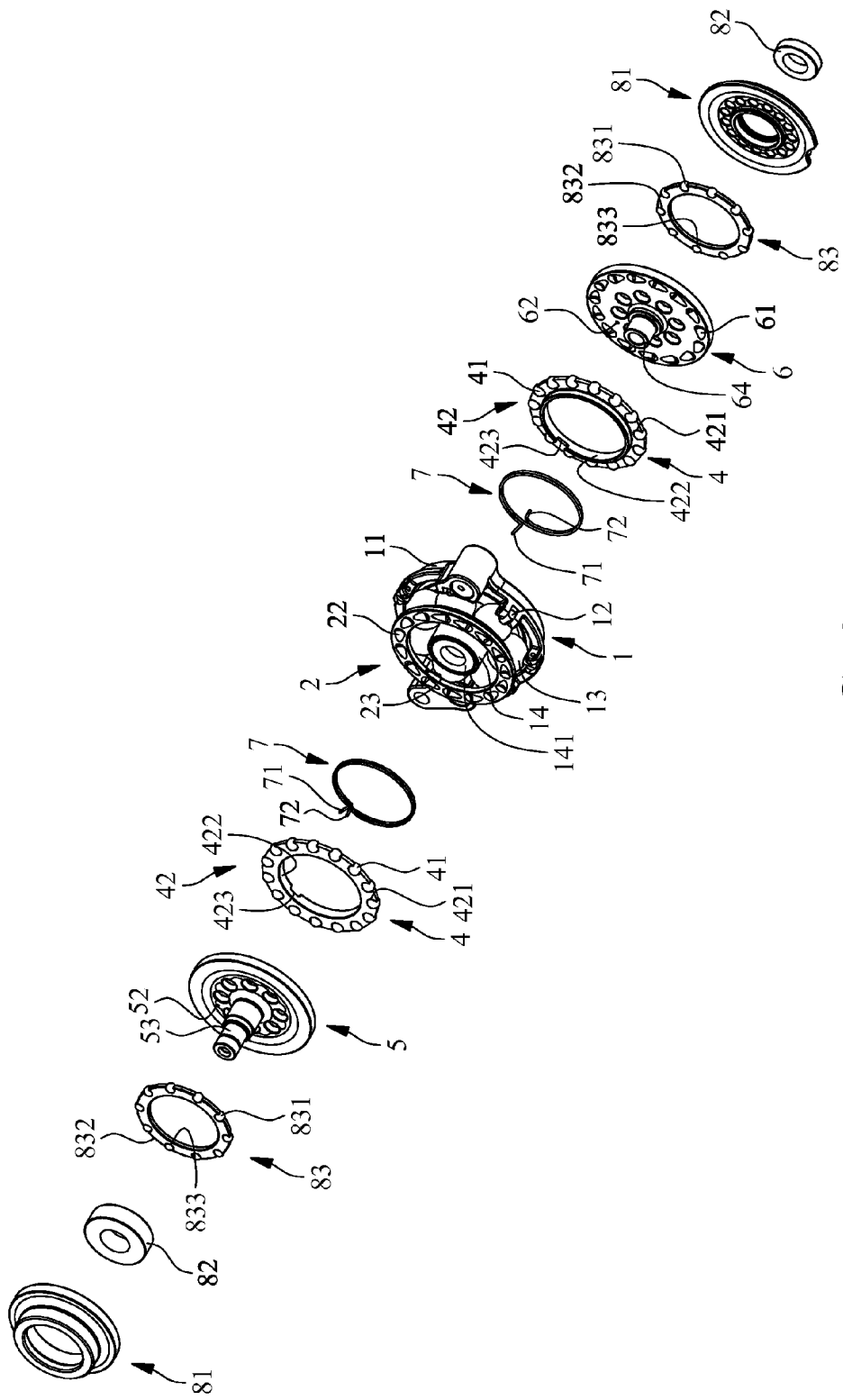
FIG. 2 is an exploded view of a preferred embodiment of the present invention from another angle of view.
Figure 7:
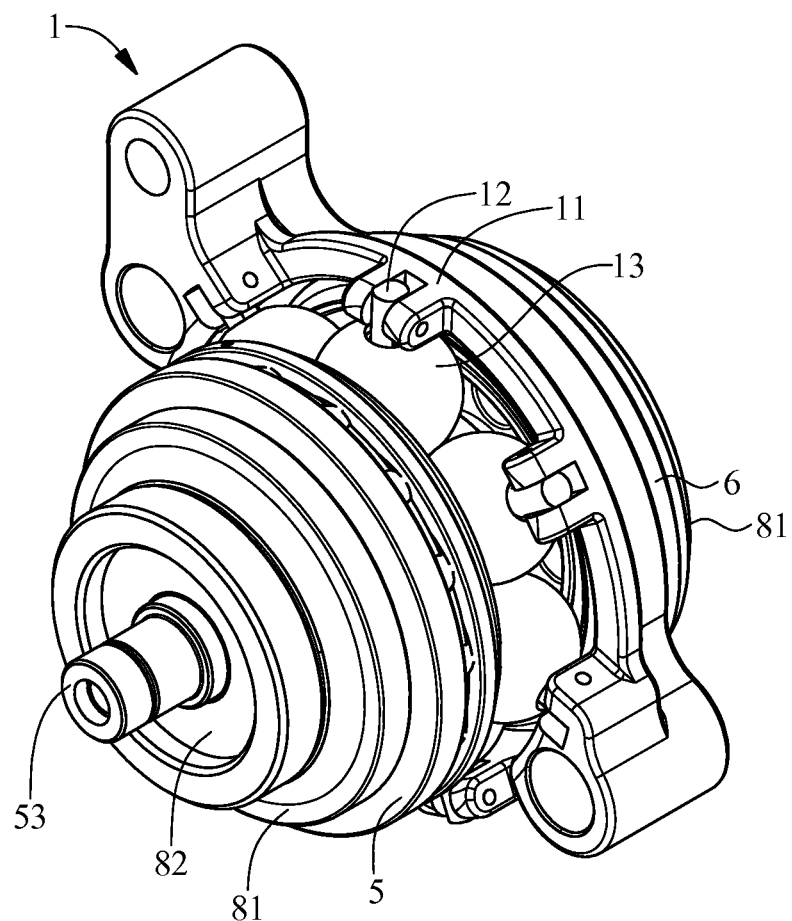
FIG. 7 is an assembled schematic view of a preferred embodiment of the present invention.
Figure 8:
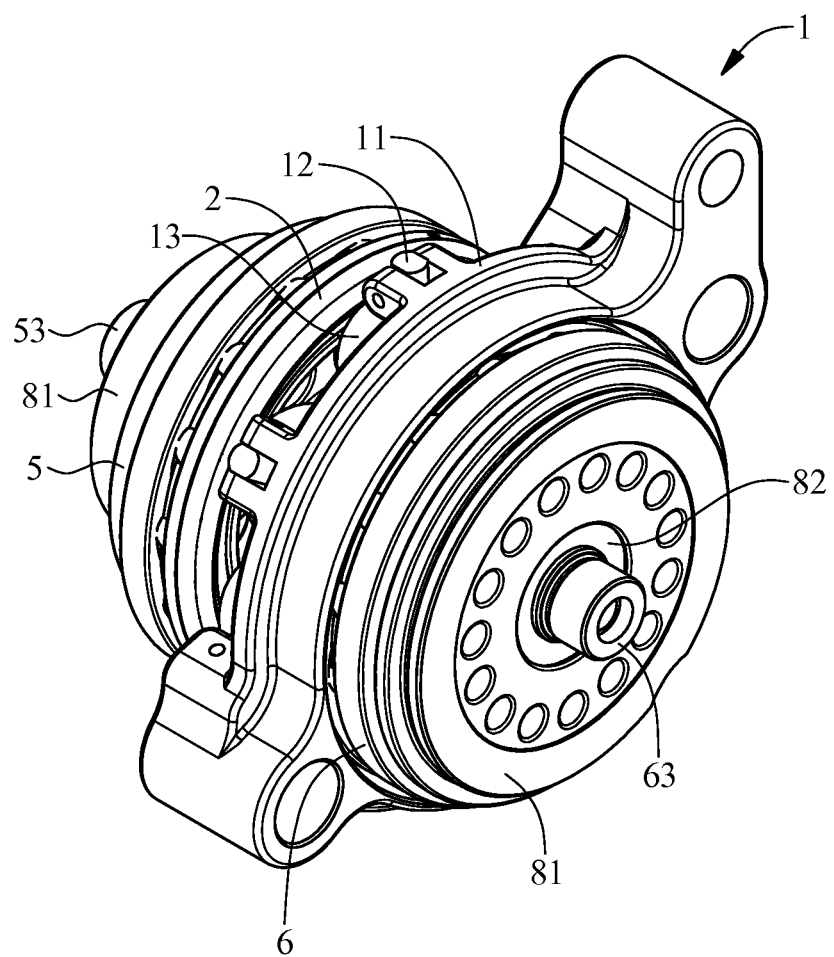
FIG. 8 is an assembled schematic view of a preferred embodiment of the present invention from another angle of view.

Referring to FIG. 1 and FIG. 7, when the power input rotator 5 has not transferred power, the helical resilient elements 7 cause the first balls 41 of the first ball ring elements 4 to stay with the heads of the first teardrop-shaped recesses 22 and the heads of the third teardrop-shaped recesses 51 (as shown in FIG. 3). When the power input rotator 5 transfers power (by rotating counterclockwise), the first balls 41 of the first ball ring elements 4 move from the heads of the first teardrop-shaped recesses 22 and the heads of the third teardrop-shaped recesses 51 to the tails of the first teardrop-shaped recesses 22 and the tails of the third teardrop-shaped recesses 51 (as shown in FIG. 3), such that the power input clamp ring element 2 moves in the axial direction of the support rotator 14 and toward the transmission balls 13 to therefore pull the two ends of each helical resilient element 7 away from each other. Similarly, when the power output rotator 6 has not transferred power, the helical resilient elements 7 cause the first balls 41 of the first ball ring elements 4 to stay with the heads of the second teardrop-shaped recesses 32 (as shown in FIG. 3) and the heads of the fourth teardrop-shaped recesses 61. When the power output rotator 6 are driven by the power input rotator 5, the power input clamp ring element 2, the transmission balls 13 and the power output clamp ring element 3 (as shown in FIG. 3) to move and transfer power (by rotating clockwise), the first balls 41 of the first ball ring elements 4 move from the heads of the second teardrop-shaped recesses 32 and the heads of the fourth teardrop-shaped recesses 61 toward the tails of the second teardrop-shaped recesses 32 (as shown in FIG. 3) and the tails of the fourth teardrop-shaped recesses 61, such that the power output clamp ring element 3 moves in the axial direction of the support rotator 14 and toward the transmission balls 13 to therefore pull the two ends of each helical resilient element 7 away from each other. Afterward, the transmission balls 13 are movably clamped between the inward-tilted power input ring surface 21, the inward-tilted power output ring surface 31 and the outer circumferential surface of the support rotator 14. Then, the power of the power input rotator 5 is transferred to the power output rotator 6 through the power input clamp ring element 2, the transmission balls 14 and the power output clamp ring element 3. The power input rotator 5 drives the power input clamp ring element 2 to rotate counterclockwise. The power input clamp ring element 2 drives the transmission balls 13 to rotate clockwise. The transmission balls 13 drive the power output clamp ring element 3 and the power output rotator 6 to rotate clockwise.

As described before, since the transmission balls 13 come into smooth contact with the inward-tilted power input ring surface 21, and the inward-tilted power output ring surface 31 comes into smooth contact with the circumferential surface of the support rotator 14, the linear gear shift power transfer mechanism of the present invention is structurally simple and compact, incurs little transmission loss, and never jerks while shifting gear.

Referring to FIG. 1 and FIG. 7 and the above description, regarding the linear gear shift power transfer mechanism, the power input rotator 5 and the power output rotator 6 rotate in opposite directions.

Referring to FIG. 1, FIG. 3, FIG. 5 and FIG. 6, regarding the linear gear shift power transfer mechanism, the bulging ring elements 422 are received in the power input clamp ring element 2 and the power output clamp ring element 3, respectively. Therefore, the linear gear shift power transfer mechanism of the present invention is capable of reducing width and reducing volume.

Referring to FIG. 1 and FIG. 3, regarding the linear gear shift power transfer mechanism, the power input rotator 5 has a first connection shaft 54 for pivotally connecting with a bearing 141 disposed on a lateral side of the support rotator 14. The power output rotator 6 has a second connection shaft 64 for pivotally connecting with another bearing 141 disposed on the other lateral side of the support rotator 14. Therefore, the support rotator 14 is supported by the power input rotator 5 and the power output rotator 6, whereas the power input rotator 5 and the power output rotator 6 connect with each other and rotate in reverse direction.

Referring to FIG. 1, FIG. 3, FIG. 7 and FIG. 8, the linear gear shift power transfer mechanism further comprises two annular covers 81, two bearings 82 and two second ball ring elements 83. A power input shaft 53 is disposed on the other lateral side of the power input rotator 5. A power output shaft 63 is disposed on the other lateral side of the power output rotator 6. The second ball ring elements 83 each have a plurality of second balls 831 and a second positioning ring element 832. The second positioning ring elements 832 each have a plurality of second positioning portions 833 whereby the second balls 831 are positioned, respectively. The second positioning portions 833 are recesses or through holes. The bearings 82 fit around the power input shaft 53 and the power output shaft 63, respectively. The annular covers 81 fit around the bearings 82, respectively. The second balls 831 of the second ball ring elements 83 are movably clamped between the recesses of the annular covers 81 and recess of the power input rotator 5 and between the recesses of the annular covers 81 and recess of the power output rotator 6.

Figure 13:
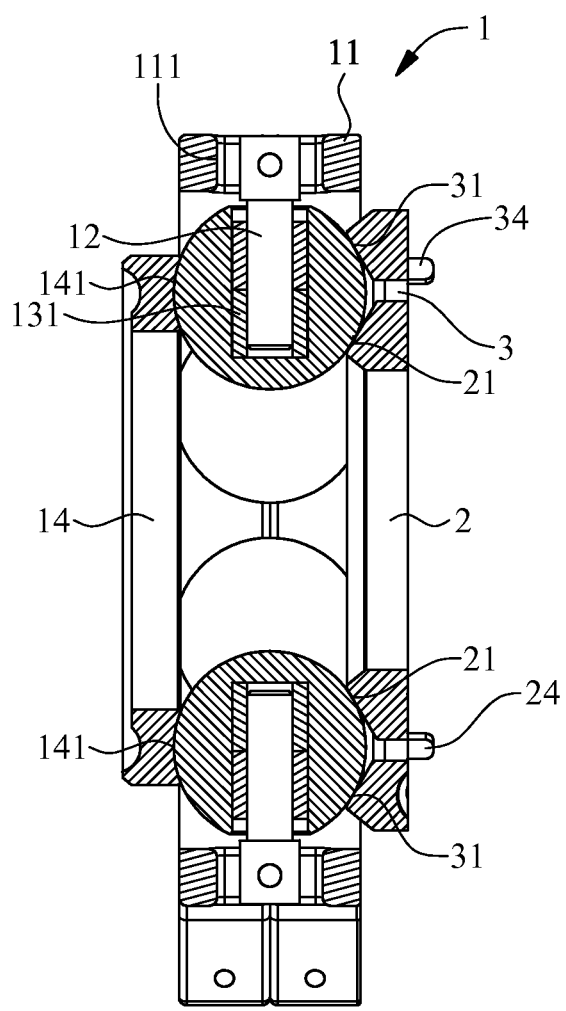
FIG. 13 is a cross-sectional view of a gear shift unit, a power input clamp ring element and a power output clamp ring element according to another preferred embodiment of the present invention.
Figure 14:
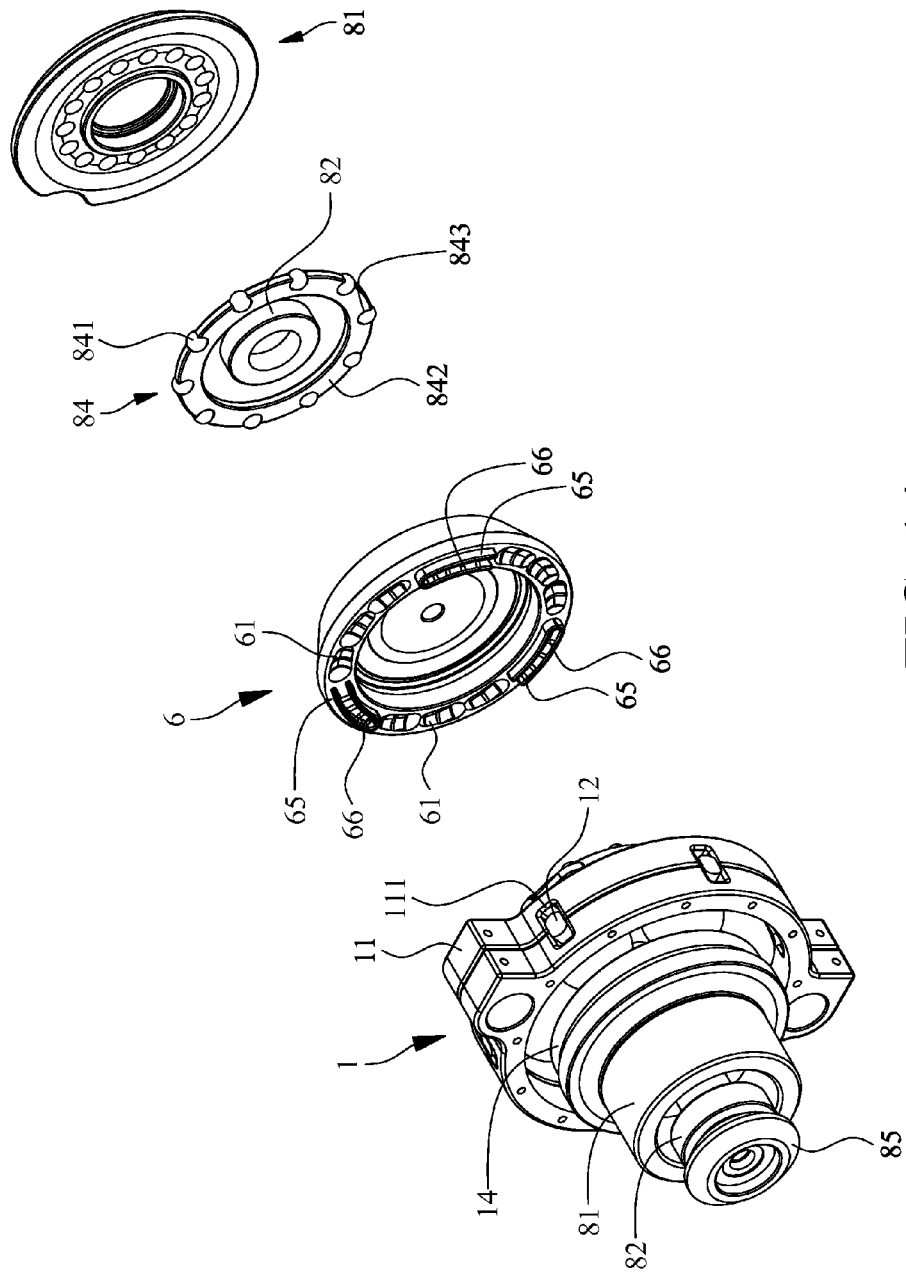
FIG. 14 is another partial assembled schematic view of another preferred embodiment of the present invention.
Figure 15:
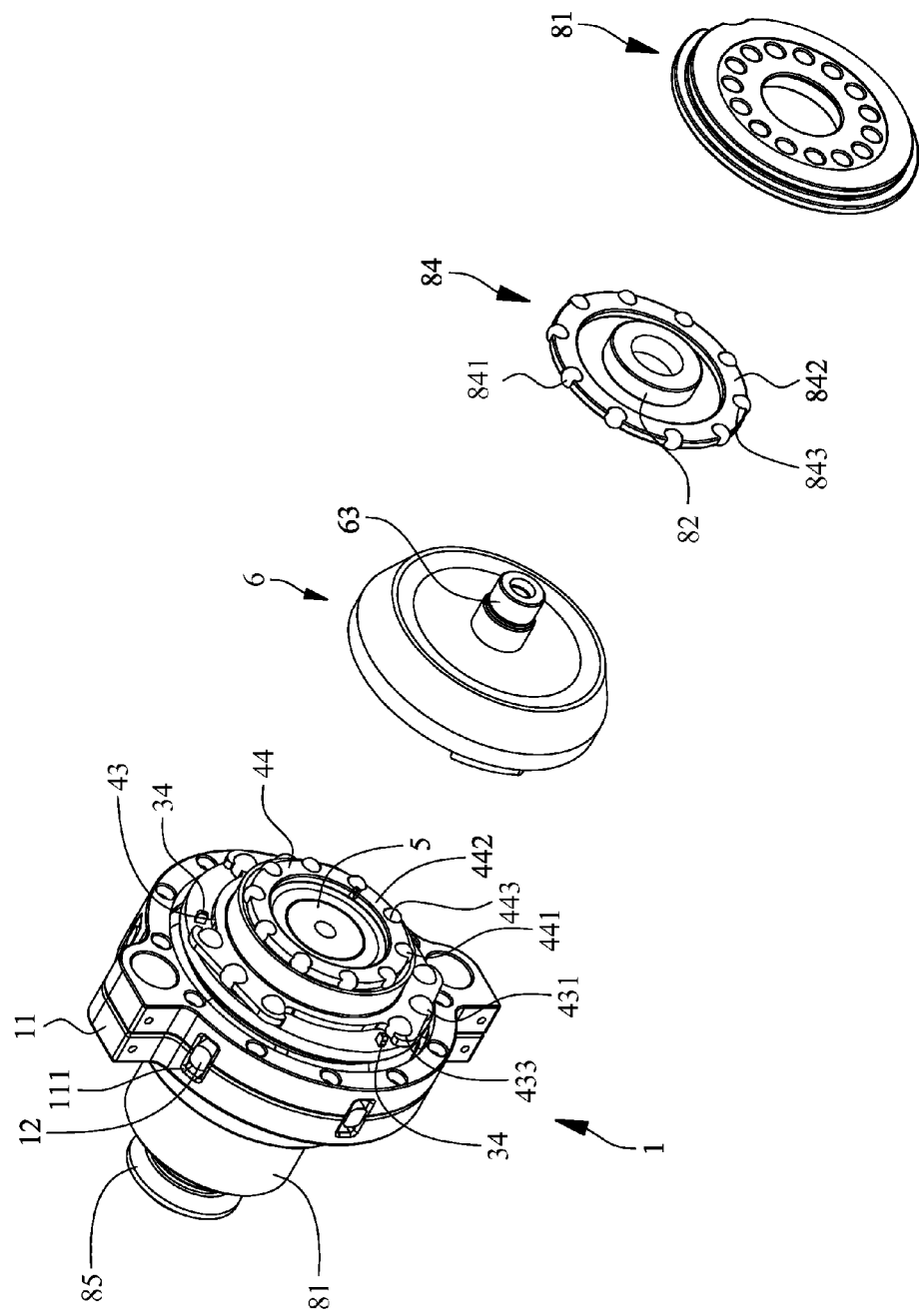
FIG. 15 is another partial assembled schematic view of another preferred embodiment of the present invention from another angle of view.

Referring to FIG. 9 through FIG. 18, to illustrate how transmission balls 13, driving posts 12, power input clamp ring element 2 and power output clamp ring element 3 are connected, FIG. 13 shows only how two transmission balls 13 and two driving posts 12 are connected to the power input clamp ring element 2 and power output clamp ring element 3, because the other transmission balls and driving posts not shown are connected in the same way as illustrated with FIG. 13. As shown in the diagrams, the present invention provides another linear gear shift power transfer mechanism which comprises a gear shift unit 1, a power input clamp ring element 2, a power output clamp ring element 3, a first ball ring element 4, a second ball ring element 43, a power input rotator 5, a power output rotator 6 and a plurality of elastic elements 56, 66. The gear shift unit 1 has a driving ring element 11, a plurality of driving posts 12, a plurality of transmission balls 13 and a support rotator 14. The transmission balls 13 are spaced apart from each other by the same angle of circumference and movably disposed on a lateral ring surface 142 of the support rotator 14. The lateral ring surface 142 is concaved and curved to thereby operate in conjunction with the transmission balls 13. The transmission balls 13 each have a cylindrical receiving portion 131 along the radial direction thereof The cylindrical receiving portion 131 is a cylindrical receiving recess or a cylindrical receiving channel. The driving posts 12 have inward ends movably disposed in the cylindrical receiving portion 131, respectively, along the radial direction of the support rotator 14. The outward ends of the driving posts 12 are pivotally connected to a plurality of pivotal through holes 111 of the driving ring element 11 and spaced apart from each other by the same angle of circumference. The driving ring element 11 undergoes translation in the axial direction of the support rotator 14 to drive the driving posts 12 and the transmission balls 13 to rotate clockwise or counterclockwise from the radial direction of the support rotator 14 to but not reach the axial direction of the support rotator 14. The power input clamp ring element 2 has a lateral side provided with an inward-tilted power input ring surface 21 and the other lateral side provided with annularly arranged first teardrop-shaped recesses 22 and first connecting portions 24. The power output clamp ring element 3 has a lateral side provided with an inward-tilted power output ring surface 31 and the other lateral side provided with annularly arranged second teardrop-shaped recesses 32 and second connecting portions 34. The inward-tilted power input ring surface 21 of the power input clamp ring element 2 is positioned inward to the inward-tilted power output ring surface 31 of the power output clamp ring element 3. Both the inward-tilted power input ring surface 21 of the power input clamp ring element 2 and the inward-tilted power output ring surface 31 of the power output clamp ring element 3 are positioned on the same side of the transmission balls 13. The lateral ring surface 142 of the support rotator 14 is positioned beside the transmission balls 13 in a manner to be opposite to the inward-tilted power input ring surface 21 and the inward-tilted power output ring surface 31. The transmission balls 13 are movably clamped between the inward-tilted power input ring surface 21, the inward-tilted power output ring surface 31, and the lateral ring surface 142 of the support rotator 14. The heads of the first teardrop-shaped recesses 22 and the heads of the second teardrop-shaped recesses 32 face opposite tangential directions. The first ball ring element 4 has a plurality of first balls 41 and a first positioning ring element 42. The first positioning ring element 42 has a plurality of first positioning portions 421 whereby the first balls 41 are positioned, respectively. The first positioning portions 421 are spaced apart from each other by the same angle of circumference. The first positioning portions 421 are recesses or through holes. The second ball ring element 43 has a plurality of second balls 431 and a second positioning ring element 432. The second positioning ring element 432 has a plurality of second positioning portions 433 whereby the second balls 431 are positioned, respectively. The second positioning portions 433 are spaced apart from each other by the same angle of circumference. The second positioning portions 433 are recessed or through holes. The first ball ring element 4 is disposed inside the second ball ring element 43. The power input rotator 5 has a lateral side provided with annularly arranged third teardrop-shaped recesses 51 and third connecting portions 55. The third teardrop-shaped recesses 51 and the third connecting portions 55 are disposed in the vicinity of the outer edge of the power input rotator 5. The heads of the third teardrop-shaped recesses 51 and the heads of the first teardrop-shaped recesses 22 face opposite tangential directions. The first balls 41 of the first ball ring element 4 are movably clamped between the first teardrop-shaped recesses 22 and the third teardrop-shaped recesses 51. The diameter of the first balls 41 is slightly less than the diameter of the heads of the first teardrop-shaped recesses 22 and the diameter of the heads of the third teardrop-shaped recesses 51. The power output rotator 6 has a lateral side provided with annularly arranged fourth teardrop-shaped recesses 61 and fourth connecting portions 65. The fourth teardrop-shaped recesses 61 and the fourth connecting portions 65 are disposed in the vicinity of the outer edge of the power output rotator 6. The heads of the fourth teardrop-shaped recesses 61 and the heads of the second teardrop-shaped recesses 32 face opposite tangential directions. The second balls 431 of the second ball ring element 43 are movably clamped between the second teardrop-shaped recesses 32 and the fourth teardrop-shaped recesses 61. The diameter of the second balls 431 is slightly less than the diameter of the heads of the second teardrop-shaped recesses 32 and the diameter of the heads of the fourth teardrop-shaped recesses 61. The power output rotator 6 is cap-shaped. The power input rotator 5 is disposed inside the power output rotator 6. The elastic elements 56, 66 are connected between the first connecting portions 24 and the third connecting portions 55 and between the second connecting portions 34 and the fourth connecting portions 65, respectively.

Figure 9:
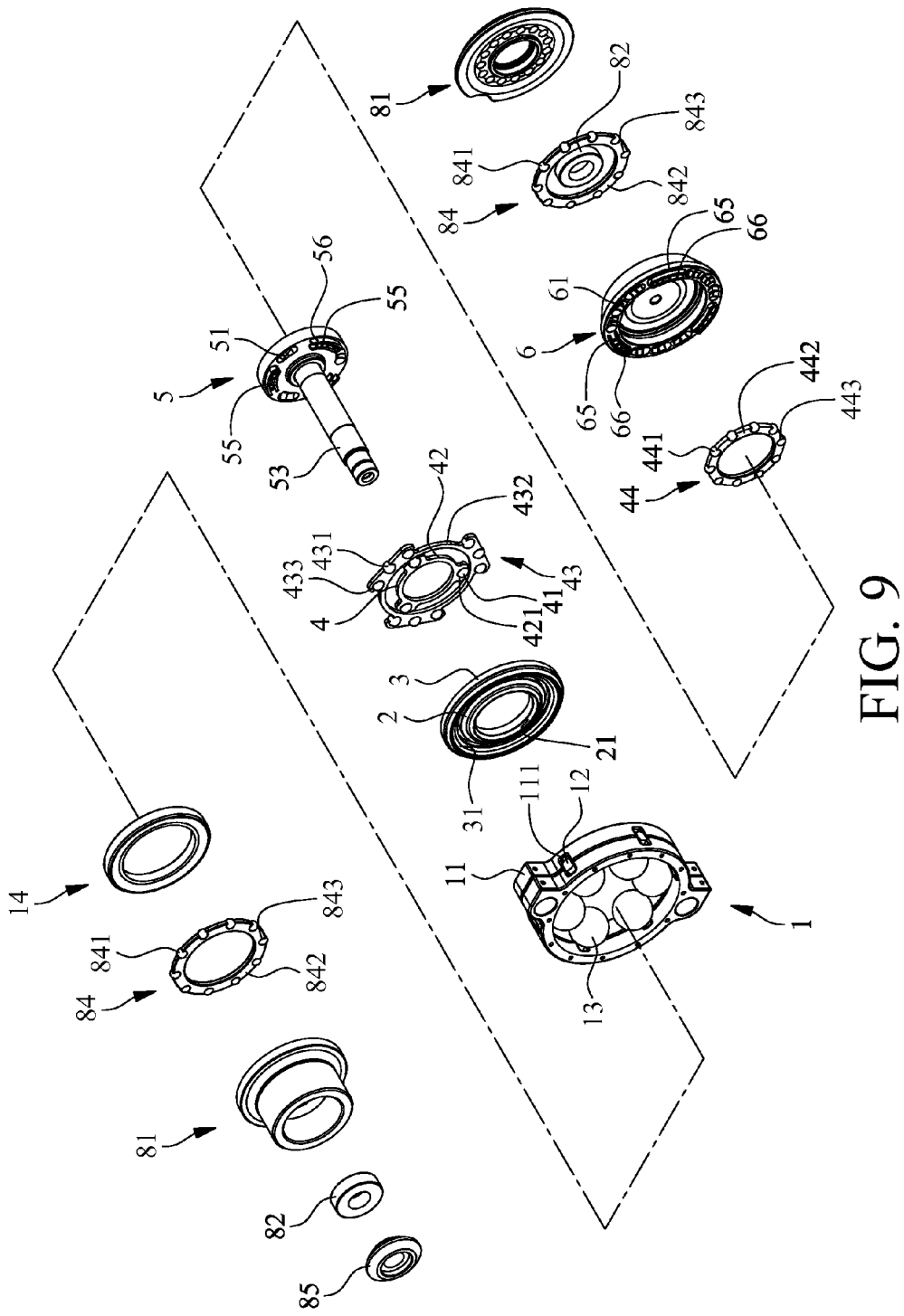
FIG. 9 is an exploded view of another preferred embodiment of the present invention.
Figure 10:
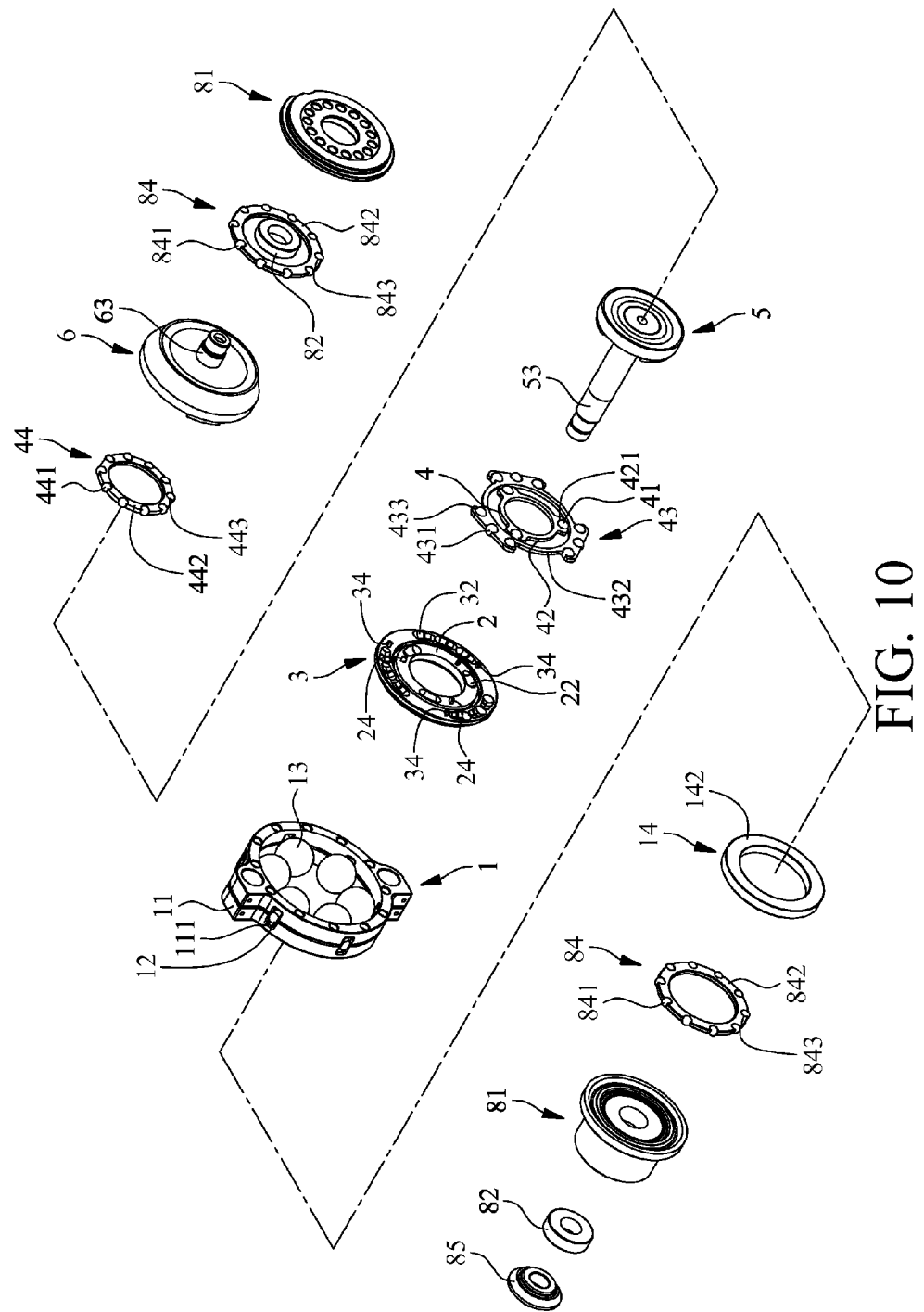
FIG. 10 is an exploded view of another preferred embodiment of the present invention from another angle of view.
Figure 11:
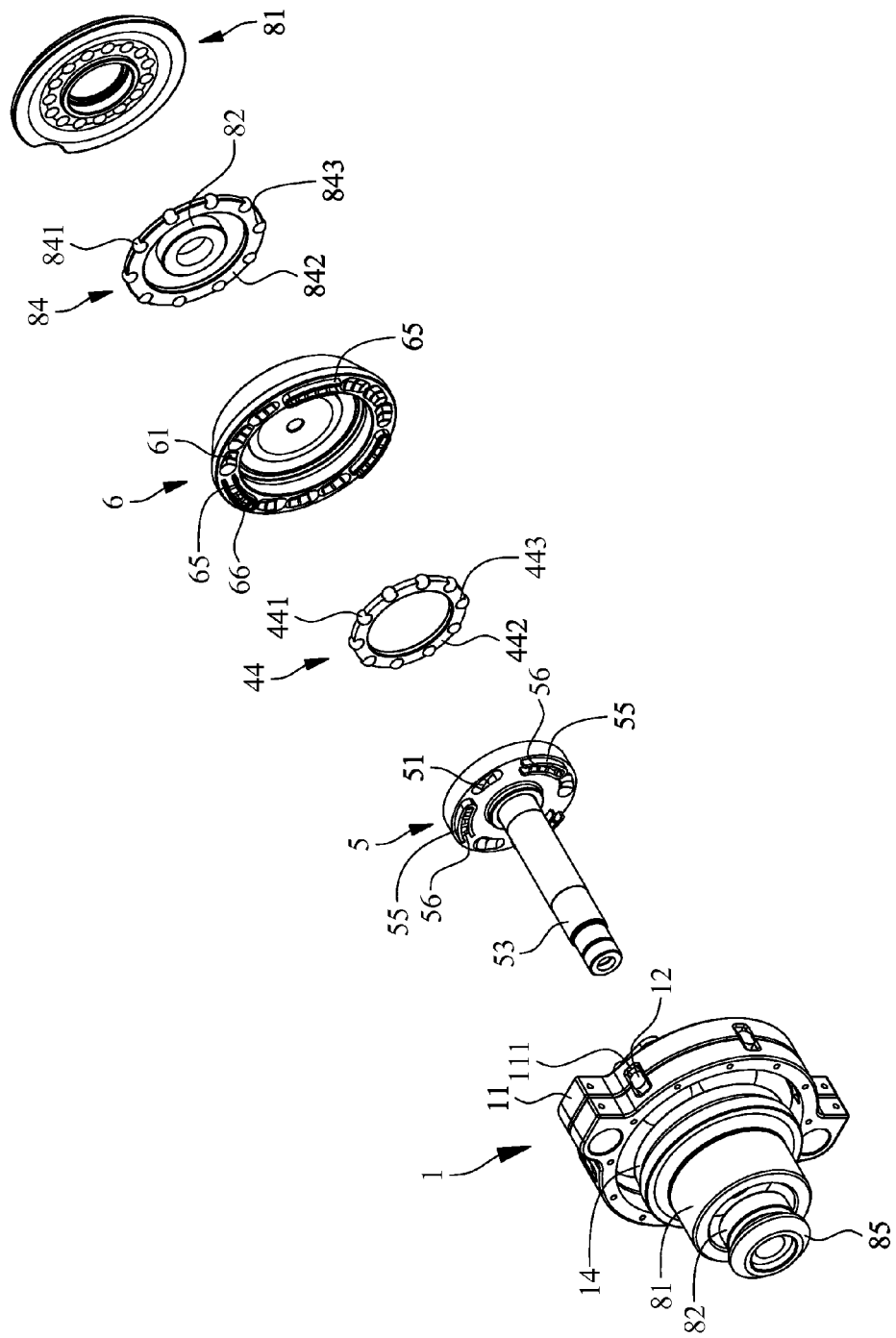
FIG. 11 is a partial assembled schematic view of another preferred embodiment of the present invention.
Figure 12:
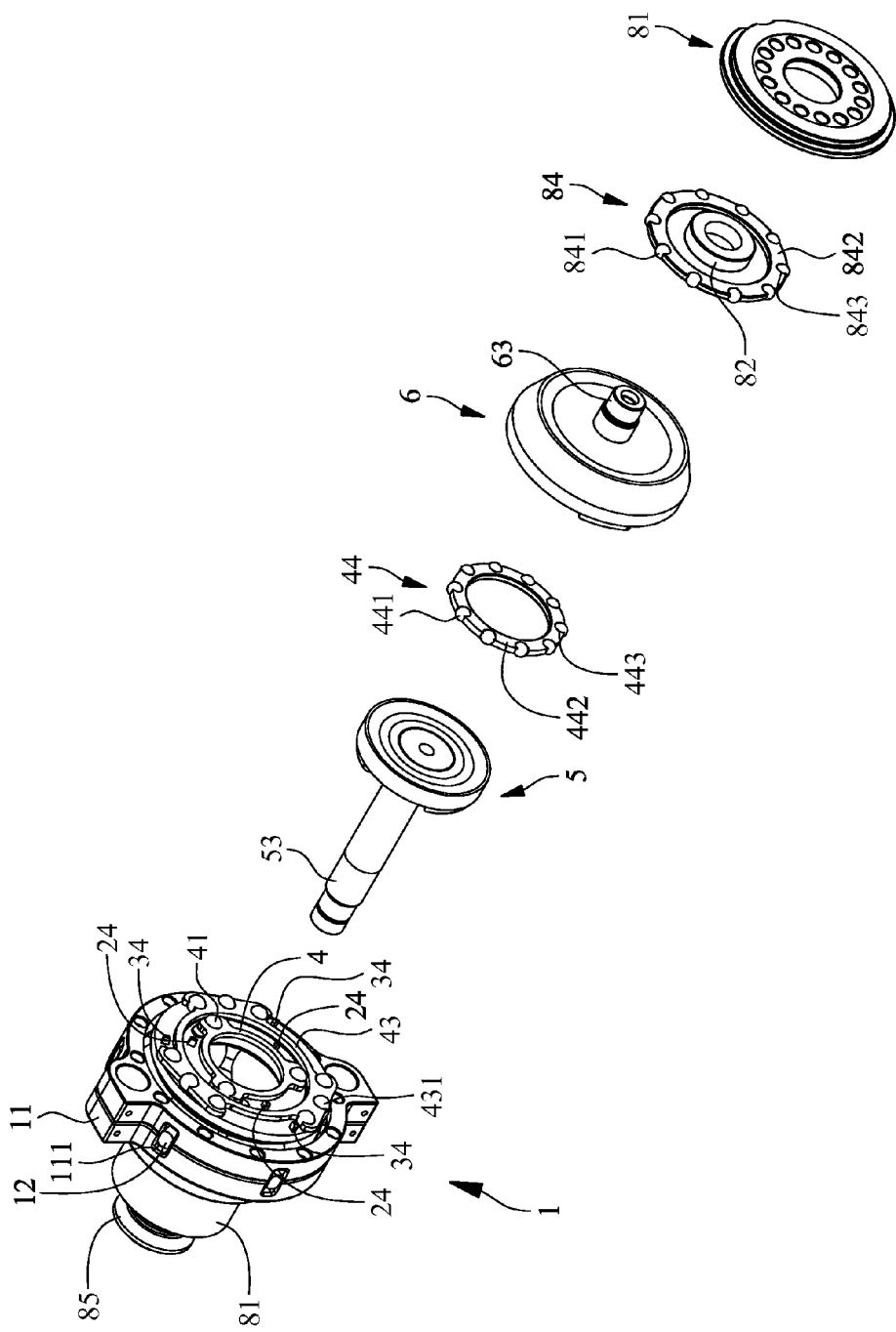
FIG. 12 is a partial assembled schematic view of another preferred embodiment of the present invention from another angle of view.
Figure 16:
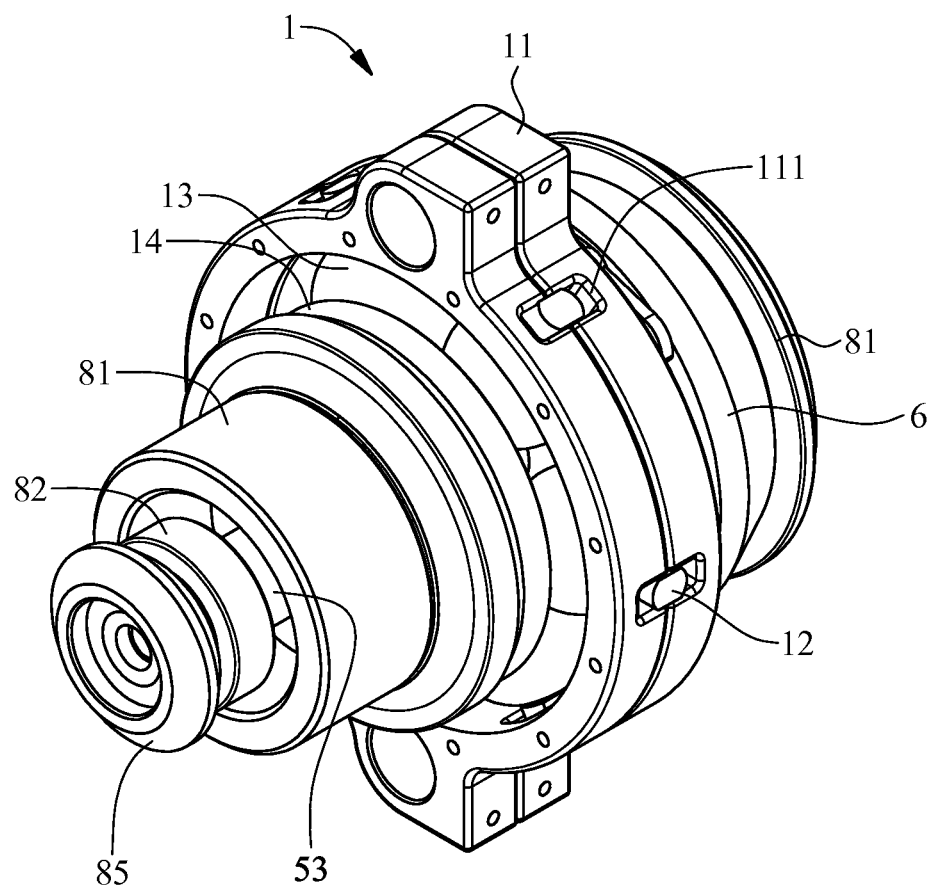
FIG. 16 is an assembled schematic view of another preferred embodiment of the present invention.
Figure 17:
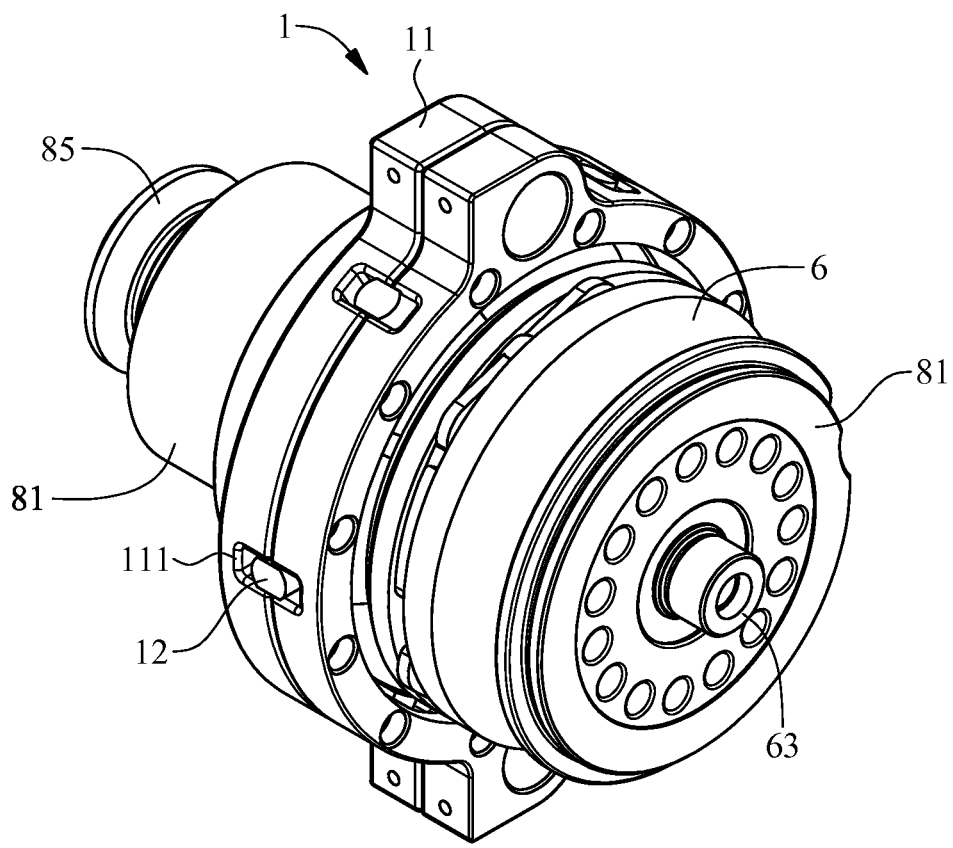
FIG. 17 is an assembled schematic view of another preferred embodiment of the present invention from another angle of view.
Figure 18:
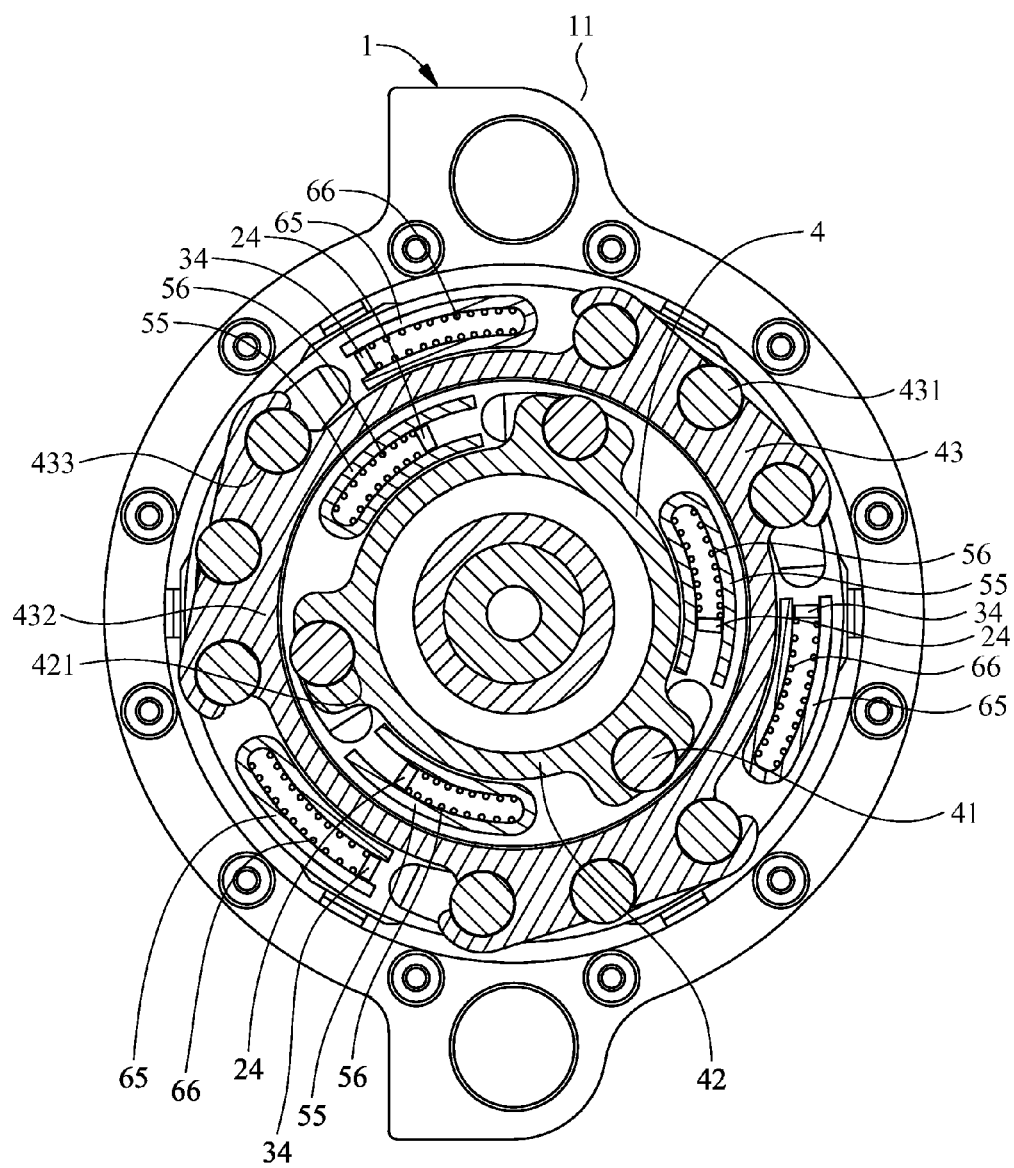
FIG. 18 is a cross-sectional view of elastic elements and first through fourth connecting portions according to another preferred embodiment of the present invention.

Referring to FIG. 9 and FIG. 16, when the power input rotator 5 has not transferred power, the elastic elements 56 cause the first balls 41 of the first ball ring element 4 to stay with the heads of the first teardrop-shaped recesses 22 (as shown in FIG. 10) and the heads of the third teardrop-shaped recesses 51. When the power input rotator 5 transfers power (by rotating clockwise), the first balls 41 of the first ball ring element 4 move from the heads of the first teardrop-shaped recesses 22 and the heads of the third teardrop-shaped recesses 51 toward the tails of the first teardrop-shaped recesses 22 (as shown in FIG. 10) and the tails of the third teardrop-shaped recesses 51, such that the power input clamp ring element 2 moves in the axial direction of the support rotator 14 and toward the transmission balls 13 to therefore pull the two ends of each elastic element 56 away from each other. Similarly, when the power output rotator 6 has not transferred power, the elastic elements 66 cause the second balls 431 of the second ball ring element 43 to stay with the heads of the second teardrop-shaped recesses 32 (as shown in FIG. 10) and the heads of the fourth teardrop-shaped recesses 61. When the power output rotator 6 is driven by the power input rotator 5, the power input clamp ring element 2, the transmission balls 13 and the power output clamp ring element 3 to move and transfer power (by rotating clockwise), the second balls 431 of the second ball ring element 43 move from the heads of the second teardrop-shaped recesses 32 and the heads of the fourth teardrop-shaped recesses 61 toward the tails of the second teardrop-shaped recesses 32 (as shown in FIG. 10) and the tails of the fourth teardrop-shaped recesses 61, such that the power output clamp ring element 3 moves in the axial direction of the support rotator 14 and toward the transmission balls 13 to therefore pull the two ends of each elastic element 66 away from each other. Afterward, the transmission balls 13 are movably clamped between the inward-tilted power input ring surface 21, the inward-tilted power output ring surface 31 and the lateral ring surface 142 of the support rotator 14. Then, power of the power input rotator 5 is transferred to the power output rotator 6 through the power input clamp ring element 2, the transmission balls 14 and the power output clamp ring element 3. The power input rotator 5 drives the power input clamp ring element 2 and the transmission balls 13 to rotate clockwise. The transmission balls 13 drive the power output clamp ring element 3 and the power output rotator 6 to rotate clockwise.

As described before, since the transmission balls 13 come into smooth contact with the inward-tilted power input ring surface 21, and the inward-tilted power output ring surface 31 comes into smooth contact with the lateral ring surface 142 of the support rotator 14, the linear gear shift power transfer mechanism of the present invention is structurally simple and compact, incurs little transmission loss, and never jerks while shifting gear.

Referring to FIG. 9 and FIG. 16 and the above description, regarding the other linear gear shift power transfer mechanism, the power input rotator 5 and the power output rotator 6 rotate in the same direction.

Referring to FIG. 9 through FIG. 12 and FIG. 15, regarding the other linear gear shift power transfer mechanism, the power input rotator 5 comes into smooth contact with the power output rotator 6, and the other linear gear shift power transfer mechanism further comprises a fourth ball ring element 44 having a plurality of fourth balls 441 and a fourth positioning ring element 442. The fourth positioning ring element 442 has a plurality of fourth positioning portions 443 whereby the fourth balls 441 are positioned, respectively. The fourth positioning portions 443 are recesses or through holes. The fourth balls 441 of the fourth positioning ring element 442 are movably clamped between the recess of the power input rotator 5 and the recess of the power output rotator 6 to therefore reduce the loss incurred by the friction between the power input rotator 5 and the power output rotator 6.

Referring to FIG. 9, FIG. 10, FIG. 16 and FIG. 17, the other linear gear shift power transfer mechanism further comprises two annular covers 81, two bearings 82 and two third ball ring elements 84. A power input shaft 53 is disposed on the other lateral side of the power input rotator 5. A power output shaft 63 is disposed on the other lateral side of the power output rotator 6. The third ball ring elements 84 each have a plurality of third balls 841 and a third positioning ring element 842. The third positioning ring elements 842 each have a plurality of third positioning portions 843 whereby the third balls 841 are positioned, respectively. The third positioning portions 843 are recesses or through holes. The bearings 82 fit around the power input shaft 53 and the power output shaft 63, respectively. The annular covers 81 fit around the bearings 82, respectively. The third balls 841 of the third ball ring elements 84 are movably clamped between the recesses of the annular covers 81 and the recess of the support rotator 14 and between the recesses of the annular covers 81 and the recess of the power output rotator 6, respectively. The power input shaft 53 passes through the first ball ring element 4, the power input clamp ring element 2, the transmission balls 14, the support rotator 14, the third ball ring elements 84, the annular covers 81 and the bearings 82 to connect with a power input bevel gear 85.

Referring to FIG. 9 through FIG. 12, FIG. 14, FIG. 15 and FIG. 18, regarding the other linear gear shift power transfer mechanism, the first connecting portions 24 and the second connecting portions 34 are each a bulging structure. The third connecting portions 55 and the fourth connecting portions 65 are each a U-shaped receiving structure. The elastic elements 56, 66 are each a helical spring. The openings of the U-shaped receiving structures of the power input rotator 5 and the openings of the U-shaped receiving structures of the power output rotator 6 face opposite tangential directions. The bulging structures are located at or in the vicinity of the openings of the U-shaped receiving structures, respectively. The elastic elements 56, 66 are disposed inside the U-shaped receiving structures, respectively. The two ends of the helical springs are fixedly connected to the bulging structures and U-shaped ends of the U-shaped receiving structures, respectively, such that the helical springs are firmly positioned.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A linear gear shift power transfer mechanism, comprising:
   a gear shift unit having a support rotator, a plurality of transmission balls and a plurality of driving posts, with the transmission balls spaced apart from each other and movably disposed at the support rotator, the transmission balls each having a cylindrical receiving portion along a radial direction thereof, the driving posts having inward ends movably disposed in the cylindrical receiving portions, respectively, along a radial direction of the support rotator, and the driving posts driving the support rotator to rotate;
   a power input clamp ring element having a lateral side provided with an inward-tilted power input ring surface and another lateral side provided with first teardrop-shaped recesses arranged annularly, wherein a first radial positioning hole is disposed at an inner edge of the power input clamp ring element;
   a power output clamp ring element having a lateral side provided with an inward-tilted power output ring surface and another lateral side provided with annularly arranged second teardrop-shaped recesses, wherein a second radial positioning hole is disposed at an inner edge of the power output clamp ring element, with the transmission balls movably clamped between the inward-tilted power input ring surface, the inward-tilted power output ring surface and the support rotator, wherein heads of the first teardrop-shaped recesses and heads of the second teardrop-shaped recesses face same tangential direction;
   two first ball ring elements each having a plurality of first balls and a first positioning ring element, with the first positioning ring elements each having a plurality of first positioning portions whereby the first balls are positioned, respectively, wherein a bulging ring element is disposed on an inner edge of each said first positioning ring element and has a limiting slot;
   a power input rotator having a lateral side provided with a first axial positioning hole and annularly arranged third teardrop-shaped recesses, wherein heads of the third teardrop-shaped recesses and heads of the first teardrop-shaped recesses face opposite tangential directions, wherein the first balls of the first ball ring elements are movably clamped between the first teardrop-shaped recesses and the third teardrop-shaped recesses;
   a power output rotator having a lateral side provided with a second axial positioning hole and annularly arranged fourth teardrop-shaped recesses, wherein heads of the fourth teardrop-shaped recesses and heads of the second teardrop-shaped recesses face opposite tangential directions, wherein the first balls of the first ball ring elements are movably clamped between the second teardrop-shaped recesses and the fourth teardrop-shaped recesses; and
   two helical resilient elements each having two ends provided with a radial positioning post and an axial positioning post, respectively, the two helical resilient elements being received in the bulging ring elements, respectively, with the radial positioning posts disposed in the first radial positioning hole and the second radial positioning hole through the limiting slots, respectively, and with the axial positioning posts disposed in the first axial positioning hole and the second axial positioning hole, respectively.

2. The linear gear shift power transfer mechanism of claim 1, wherein the inward-tilted power input ring surface and the inward-tilted power output ring surface are disposed on two opposing sides of the transmission balls, respectively, and the transmission balls are movably disposed on an outer circumferential surface of the support rotator.

3. The linear gear shift power transfer mechanism of claim 1, wherein the driving posts rotate from the radial direction of the support rotator to but not reach the axial direction of the support rotator.

4. The linear gear shift power transfer mechanism of claim 1, wherein the power input rotator and the power output rotator rotate in opposite directions.

5. The linear gear shift power transfer mechanism of claim 1, wherein the bulging ring elements are received in the power input clamp ring element and the power output clamp ring element, respectively.

6. The linear gear shift power transfer mechanism of claim 1, wherein the power input rotator has a first connection shaft for pivotally connecting with a lateral side of the support rotator, and the power output rotator has a second connection shaft for pivotally connecting with another lateral side of the support rotator.

7. The linear gear shift power transfer mechanism of claim 1, wherein further comprising two annular covers, two bearings and two second ball ring elements, with a power input shaft disposed on another lateral side of the power input rotator, and a power output shaft disposed on another lateral side of the power output rotator, wherein the second ball ring elements each have a plurality of second balls and a second positioning ring element, and the second positioning ring elements each have a plurality of second positioning portions whereby the second balls are positioned, respectively, wherein the bearings fit around the power input shaft and the power output shaft, respectively, and the annular covers fit around the bearings, respectively, wherein the second balls of the second ball ring elements are movably clamped between the annular covers and the power input rotator and between the annular covers and the power output rotator, respectively.

8. A linear gear shift power transfer mechanism, comprising:
   a gear shift unit having a support rotator, a plurality of transmission balls and a plurality of driving posts, with the transmission balls spaced apart from each other and movably disposed at the support rotator, and a cylindrical receiving portion disposed in a radial direction of each said transmission ball, wherein the driving posts having inward ends movably disposed in the cylindrical receiving portions, respectively, along a radial direction of the support rotator, and the driving posts driving the support rotator to rotate;
   a power input clamp ring element having a lateral side provided with an inward-tilted power input ring surface and another lateral side provided with annularly arranged first teardrop-shaped recesses and first connecting portions;
   a power output clamp ring element having a lateral side provided with an inward-tilted power output ring surface and another lateral side provided with annularly arranged second teardrop-shaped recesses and second connecting portions, with the transmission balls movably clamped between the inward-tilted power input ring surface, the inward-tilted power output ring surface and the support rotator, wherein heads of the first teardrop-shaped recesses and heads of the second teardrop-shaped recesses face opposite tangential directions;
   a first ball ring element having a plurality of first balls and a first positioning ring element, with the first positioning ring element having a plurality of first positioning portions whereby the first balls are positioned, respectively;
   a second ball ring element having a plurality of second balls and a second positioning ring element, with the second positioning ring element having a plurality of second positioning portions whereby the second balls are positioned, respectively;
   a power input rotator having a lateral side provided with annularly arranged third teardrop-shaped recesses and third connecting portions, wherein heads of the third teardrop-shaped recesses and heads of the first teardrop-shaped recesses face opposite tangential directions, and the first balls of the first ball ring element are movably clamped between the first teardrop-shaped recesses and the third teardrop-shaped recesses;
   a power output rotator having a lateral side provided with annularly arranged fourth teardrop-shaped recesses and fourth connecting portions, wherein heads of the fourth teardrop-shaped recesses and heads of the second teardrop-shaped recesses face opposite tangential directions, and the second balls of the second ball ring element are movably clamped between the second teardrop-shaped recesses and the fourth teardrop-shaped recesses; and
   a plurality of elastic elements connected between the first connecting portions and the third connecting portions and between the second connecting portions and the fourth connecting portions, respectively.

9. The linear gear shift power transfer mechanism of claim 8, wherein the inward-tilted power input ring surface and the inward-tilted power output ring surface are positioned on same side of the transmission balls, wherein a lateral ring surface of the support rotator is positioned beside the transmission balls in a manner to be opposite to the inward-tilted power input ring surface and the inward-tilted power output ring surface.

10. The linear gear shift power transfer mechanism of claim 9, further comprising a fourth ball ring element having a plurality of fourth balls and a fourth positioning ring element, with the fourth positioning ring element having a plurality of fourth positioning portions whereby the fourth balls are positioned, respectively, wherein the fourth balls of the fourth positioning ring element are movably clamped between the power input rotator and the power output rotator.

11. The linear gear shift power transfer mechanism of claim 9, further comprising two annular covers, two bearings and two third ball ring elements, with a power input shaft disposed on another lateral side of the power input rotator, and a power output shaft disposed on another lateral side of the power output rotator, wherein the third ball ring elements each have a plurality of third balls and a third positioning ring element, and the third positioning ring elements each have a plurality of third positioning portions whereby the third balls are positioned, respectively, wherein the bearings fit around the power input shaft and the power output shaft, respectively, and the annular covers fit around the bearings, respectively, wherein the third balls of the third ball ring elements are movably clamped between the annular covers and the support rotator and between the annular covers and the power output rotator, respectively.

12. The linear gear shift power transfer mechanism of claim 8, wherein the driving posts rotate from the radial direction of the support rotator to but not reach the axial direction of the support rotator.

13. The linear gear shift power transfer mechanism of claim 8, wherein the power input rotator and the power output rotator rotate in same direction.

14. The linear gear shift power transfer mechanism of claim 8, wherein the first connecting portions and the second connecting portions are each a bulging structure, wherein the third connecting portions and the fourth connecting portions are each a U-shaped receiving structure, with the bulging structures disposed at openings of the U-shaped receiving structures, respectively, and the elastic elements disposed in the U-shaped receiving structures, respectively.

\* \* \* \* \*